May 30, 1933.  O. T. BLÁTHY  1,911,790

ROTARY FIELD MAGNET

Filed Jan. 24, 1931   2 Sheets-Sheet 1

Inventor:
Otto Titus Bláthy
By
Pennie Davis Marvin & Edmonds
Attorneys

May 30, 1933. O. T. BLÁTHY 1,911,790
ROTARY FIELD MAGNET
Filed Jan. 24, 1931 2 Sheets-Sheet 2

Patented May 30, 1933

1,911,790

UNITED STATES PATENT OFFICE

OTTO TITUS BLÁTHY, OF BUDAPEST, HUNGARY

ROTARY FIELD MAGNET

Application filed January 24, 1931, Serial No. 510,929, and in Hungary July 17, 1930.

This invention relates to bipolar rotary field magnets for turbogenerators and more especially to such field magnets of the type provided with liquid cooling extended to the whole circumference of the field coils.

Hitherto the liquid cooling was generally restricted to the longitudinal sides of the field coils because the means proposed to extend the liquid cooling onto the coil heads engendered complications in the construction and necessitated a plurality of joints in the cooling chambers and channels, the tightening of which caused practically unsurmountable difficulties while leakages would cause heavy disturbances.

The object of this invention is to obviate the difficulties above referred to and to extend the liquid cooling onto the coil heads without any additional complications and additional joints to be tightened.

This object is reached, according to my invention, by the combination of a cylindrical rotor body provided with a plurality of slots and field coils therein comprising straight longitudinal and straight transversal sections extending over the mantle and the front surfaces of the rotor body respectively and arranged in a plurality of planes parallel to the axis of the rotor, with shaft portions secured to the rotor body by means of flange extensions and with straight cooling channels in the ribs of the rotor body between said slots following the longitudinal and frontal sections of said slots joined to annular channels arranged in planes parallel to the rotor axis and communicating at their frontal sections with axial channels of the shaft portions of the rotor.

The annexed drawings show diagrammatically as an example a rotor according to my invention.

Figure 1 is a sectional elevation according to line 1—1 of Fig. 2.

Figures 2, 3 and 4 are longitudinal sections according to lines 2—2, 3—3 and 4—4 of Fig. 1 respectively.

Figure 1:
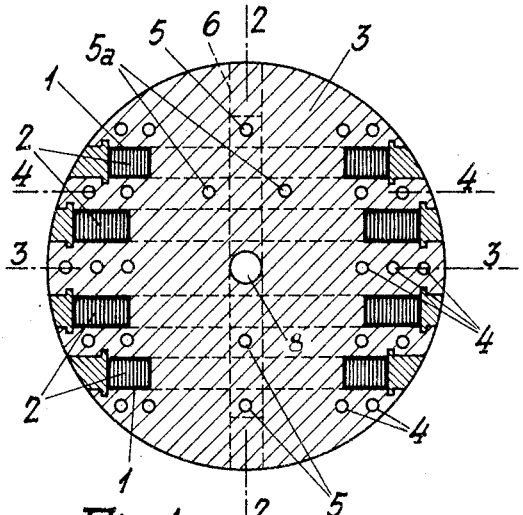
Figure 2:
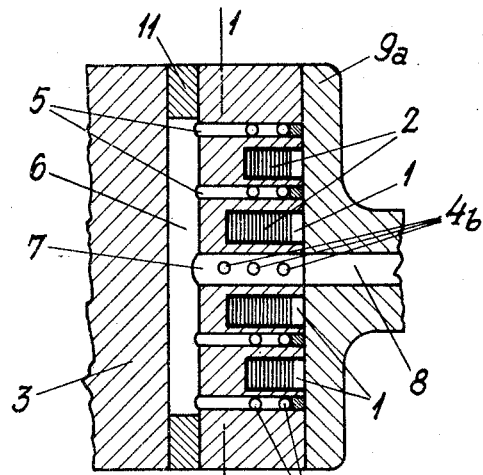
Figure 3:
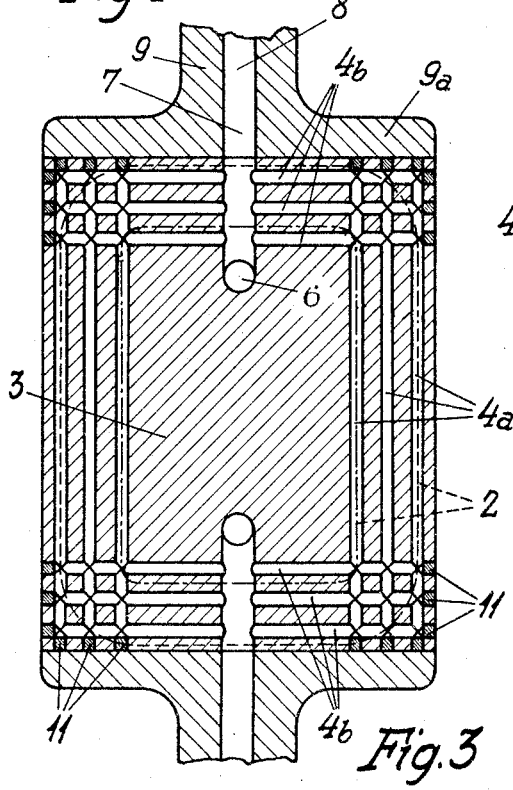

With reference to the drawings, 1 are the slots in the cylindrical iron body 3 of the rotor to receive the field windings 2. Said slots are composed of longitudinal sections extending along the mantle surface of the rotor body 3 and of straight transversal sections crossing the frontal surfaces of the rotor body which join to form annular channels surrounding completely the rotor body. Each annular channel lies in a plane parallel to the axis of the rotor. The field coils 2 are wound into said slots so that the coils are completely embedded in the body of the rotor. 4 are the cooling channels arranged in the ribs between the slots 1 and adjacent to the outermost slots. Said channels comprise straight longitudinal sections 4a formed by borings (Fig. 3) parallel to the rotor axis and straight transversal or frontal sections 4b formed by borings parallel to the front surfaces of the rotor body. The longitudinal and transversal borings join to form annular channels situated in a plane parallel to the rotor axis following the outlines of the field coils. As to be seen from Figs. 1–3 a plurality, for example, two or three longitudinal and transversal borings 4a and 4b respectively, may be arranged in the same rib of the rotor body to form a plurality of concentric annular channels. 11 are screw plugs by which the openings of the borings forming the cooling channels are tightly closed without difficulty.

The annular channels communicate at their frontal sections by means of axial borings 5 (Figs. 1 and 2) with radial borings 6 leading to the axial channels 7 coinciding with the axial borings 8 of the shaft portions 9 of the rotor.

Figure 7:
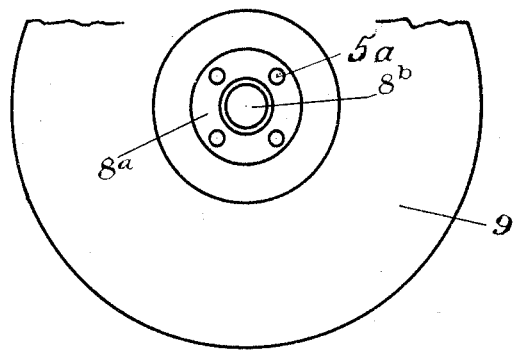
Figures 6 and 7 are detail views of a modification.
Figure 6:
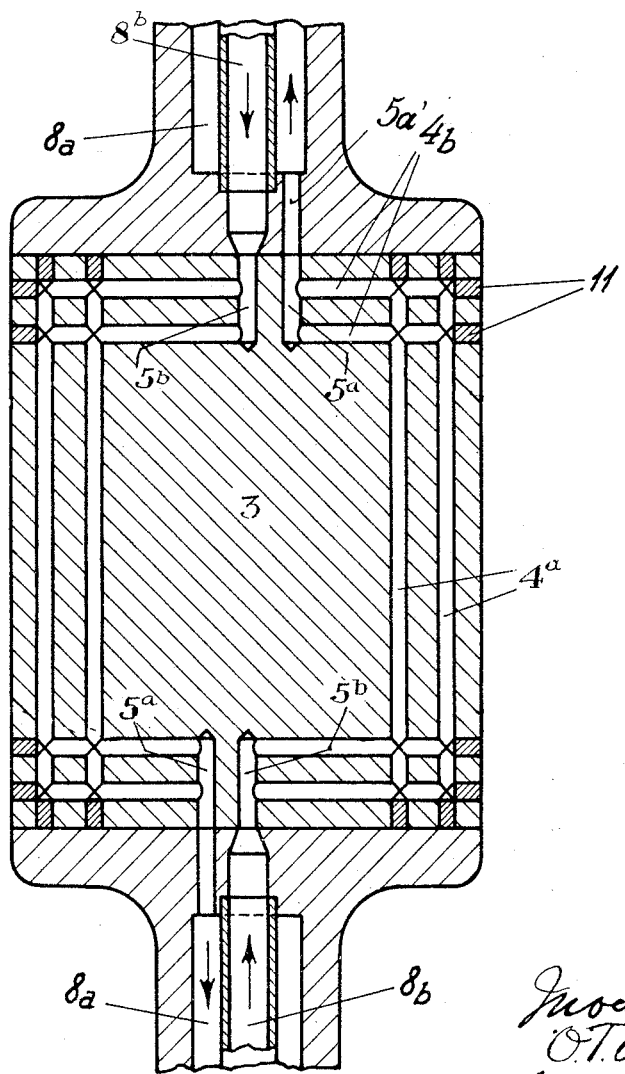

The cooling liquid enters the rotor through boring 8 of one shaft portion 9 and passes through channels 7, 6 and 5 into the several annular cooling channels 4 towards the other end of the rotor, wherefrom it passes the channels 5, 6 and 7 in reverse order to leave the rotor through boring 8 of the other shaft portion 9. If desired, however, the inlet and outlet of the cooling liquid may be located in the same shaft portion of the rotor in the shape of two concentric channels formed by a tubular piece 8b (Figs. 6 and 7) inserted into one boring 8a of larger diameter so that an annular channel is formed between the walls of boring 8a and the tubular insertion 8b. The liquid enters through tubular insertion 8b and the boring 5b at the one end of the rotor, to the cooling channels 4a, 4b, and leaves through borings 5a', which discharge into the annular channel 8a of the rotor at the other end.

The shaft portions 9 are provided with flange extensions 9a secured by means of screws, not shown in the drawings, to the rotor body 3 and cover the slots and coil heads on the frontal surfaces of the rotor body.

Figure 4:
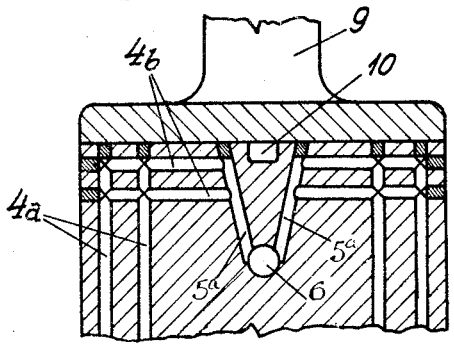
Figure 5:
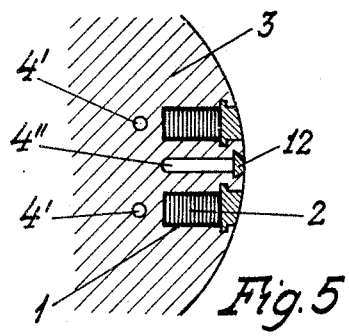
Figure 5 is a partial cross section of a modification.

It is preferable to interrupt the frontal sections of the cooling channels at the one end of the rotor by loops formed by oblique borings 5a, 5a—as to be seen from Fig. 4—giving place to channels 10 within said loops to receive the feeding conductors for the field winding.

According to the modification shown in Fig. 4, slots 4'' are cut into the surface of the rotor body and closed tightly by means of wedges 12 in order to serve as cooling channels instead of the borings of the former figures.

Besides the borings 4 or slots 4'' arranged in the ribs at the sides of the winding slots 1, further borings 4' may be arranged at the bottom of the winding slots to form similarly to borings 4a and 4b annular cooling channels.

The cooling channels may be lined with thin metal tubes introduced into the borings or slots.

What I claim is:

1. In a bipolar rotary field magnet for turbogenerators, a cylindrical rotor body provided with a plurality of slots and field windings therein comprising straight longitudinal sections and straight transversal sections in the mantle and front surfaces of the rotor body respectively arranged in a plurality of planes parallel to the rotor axis, shaft portions having flange extensions secured to the front faces of the rotor body and annular cooling channels in the rotor body between two winding slots, said slots comprising straight portions following the longitudinal and frontal portions, said slots joined to annular channels arranged in planes parallel to the field coils and communicating at their frontal portions with axial channels of said shaft portions.

2. A rotary field magnet according to claim 1, in which the cooling channels of the rotor body are formed by straight slots extending around the rotor body along the mantle surface and across the front surfaces thereof and closed tightly on the surface of the rotor body.

3. A rotary field magnet according to claim 1, in which additional annular cooling channels are provided below the bottom of the longitudinal and frontal portions of the winding slots.

In testimony whereof I affix my signature.

OTTO TITUS BLÁTHY.